United States Patent
Zhang et al.

(10) Patent No.: US 10,638,438 B2
(45) Date of Patent: Apr. 28, 2020

(54) SYNCHRONIZATION INFORMATION SENDING METHOD, SYNCHRONIZATION INFORMATION RECEIVING METHOD, BASE STATION, AND COMMUNICATIONS NODE

(71) Applicant: HUAWEI TECHNOLOGIES CO., LTD., Shenzhen (CN)

(72) Inventors: Jun Zhang, Beijing (CN); Mingchao Li, Beijing (CN); Jiezuo Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 62 days.

(21) Appl. No.: 16/166,070

(22) Filed: Oct. 20, 2018

(65) Prior Publication Data
US 2019/0059063 A1 Feb. 21, 2019

Related U.S. Application Data

(63) Continuation of application No. PCT/CN2016/079874, filed on Apr. 21, 2016.

(51) Int. Cl.
*H04W 56/00* (2009.01)
(52) U.S. Cl.
CPC ..... *H04W 56/001* (2013.01); *H04W 56/0045* (2013.01)
(58) Field of Classification Search
CPC ........ H04W 56/0045; H04W 56/0015; H04W 56/00; H04W 56/001; H04W 56/0035;
(Continued)

(56) References Cited

U.S. PATENT DOCUMENTS

2002/0105933 A1 8/2002 Higuchi
2011/0085540 A1\* 4/2011 Kuwabara ......... H04W 56/0015
370/350
(Continued)

FOREIGN PATENT DOCUMENTS

CN 1381121 A 11/2002
CN 101448315 A 6/2009
(Continued)

OTHER PUBLICATIONS

IEEE 15886V2, IEEE Std 1588-2008 (Revision of IEEE Std 1588-2002),IEEE Standard for a Precision Clock Synchronization Protocol for Networked Measurement and Control Systems,IEEE Instrumentation and Measurement Society,Technical Committee on Sensor Technology (TC-9);dated Jul. 24, 2008,total 289 pages.

*Primary Examiner* — Awet Haile
(74) *Attorney, Agent, or Firm* — Kilpatrick Townsend & Stockton LLP

(57) ABSTRACT

A synchronization information sending method, a synchronization information receiving method, a base station, and a communications node are provided. The sending method includes: obtaining, by a communications node, a pulse per second PPS; obtaining, by the communications node, a first time T1 based on the PPS; obtaining, by the communications node, a second time T2 based on the subframe; determining, by the communications node, a first time difference TD 1 based on the first time T1 and the second time T2; obtaining, by the communications node, a second time difference TD 2 based on the first time difference TD 1 and the TA. Different base stations use a same pulse per second PPS as a reference to adjust a sending time, a radio frame number, and a subframe number of a subframe, so that the different base stations are synchronized with each other.

15 Claims, 4 Drawing Sheets

(58) Field of Classification Search
CPC ............ H04W 56/006; H04W 56/0065; H04L 69/28; H04L 7/0008; H04L 7/0087
See application file for complete search history.

(56) References Cited

U.S. PATENT DOCUMENTS

| | | |
|---|---|---|
| 2012/0099521 A1 | 4/2012 | Ryu et al. |
| 2012/0182180 A1* | 7/2012 | Wolf ........................ G01S 5/021 |
| | | 342/357.29 |
| 2013/0279393 A1 | 10/2013 | Rubin et al. |
| 2014/0070980 A1 | 3/2014 | Park et al. |
| 2014/0119334 A1 | 5/2014 | Kazmi et al. |
| 2015/0195113 A1 | 7/2015 | Kim et al. |
| 2015/0318941 A1 | 11/2015 | Zheng et al. |
| 2015/0373660 A1* | 12/2015 | Gunnarsson ...... H04W 56/0045 |
| | | 370/350 |
| 2017/0055237 A1 | 2/2017 | Byun |
| 2017/0086159 A1* | 3/2017 | Ameixiera ............ H04W 48/10 |
| 2017/0280342 A1* | 9/2017 | Sugiyama ......... H04W 56/0065 |

FOREIGN PATENT DOCUMENTS

| | | |
|---|---|---|
| CN | 102082655 A | 6/2011 |
| CN | 102083195 A | 6/2011 |
| CN | 104507154 A | 4/2015 |
| EP | 3214879 A1 | 9/2017 |
| WO | 2012173561 A2 | 12/2012 |
| WO | 2013184532 A1 | 12/2013 |
| WO | 2013191385 A1 | 12/2013 |
| WO | 2014014396 A1 | 1/2014 |
| WO | 2014200284 A1 | 12/2014 |
| WO | 2015170901 A1 | 11/2015 |

\* cited by examiner

SYNCHRONIZATION INFORMATION SENDING METHOD, SYNCHRONIZATION INFORMATION RECEIVING METHOD, BASE STATION, AND COMMUNICATIONS NODE

CROSS-REFERENCE TO RELATED APPLICATIONS

This application is a continuation of International Application No. PCT/CN2016/079874, filed on Apr. 21, 2016, the disclosure of which is hereby incorporated by reference in its entirety.

TECHNICAL FIELD

Embodiments of the present invention relate to the communications system, and in particular, to a synchronization information sending method, a synchronization information receiving method, a base station, and a communications node.

BACKGROUND

Device-to-device (D2D) communication or vehicle to vehicle (V2V) communication is a technology in which communications nodes directly communicate with each other. The communications nodes directly communicate with each other by using a radio resource allocated by a base station.

A communications node is usually synchronized with a base station to which the communications node belongs. When a plurality of communications nodes separately belong to different base stations, if the base stations are not synchronized with each other, the plurality of communications nodes that separately belong to the different base stations are not synchronized with each other either. Therefore, when the plurality of communications nodes that separately belong to the different base stations perform D2D communication or V2V communication with each other, the communications nodes cannot transmit data to each other because the communications nodes are not synchronized with each other. For example, a communications node 1 accesses a base station 1, and a communications node 2 accesses a base station 2. If the base station 1 is not synchronized with the base station 2, the communications node 1 is not synchronized with the communications node 2 either. When the communications node 1 performs D2D communication or V2V communication with the communications node 2, for example, in the V2V communication, if a sudden accident occurs on a vehicle in front, it is required that information indicating that an accident occurs on the vehicle in front can be received by another vehicle in time. For example, the vehicle in front serves as the communications node 1, and the another vehicle serves as the communications node 2. The communications node 1 sends a data subframe at a moment 1. Because the communications node 2 is not synchronized with the communications node 1, the data subframe has not arrived at a moment 1 of the communications node 2. Therefore, the communications node 2 cannot correctly receive the data subframe sent by the communications node 1. This severely affects reliability and safety for the D2D communication, especially, in the V2V communication.

Therefore, a technical solution is urgently required in the industry to improve reliability and safety for the D2D communication and the V2V communication.

SUMMARY

Embodiments of the present invention provide a synchronization information sending method, a synchronization information receiving method, a base station, and a communications node, to improve reliability and safety for D2D communication or V2V communication.

According to a first aspect, a synchronization information sending method is provided, including: obtaining, by a communications node, a pulse per second PPS; obtaining, by the communications node, a first time T1 based on the PPS; receiving, by the communications node, a subframe and an identifier of the subframe that are sent by a base station; obtaining, by the communications node, a second time T2 based on the subframe, where the second time T2 is a time at which the subframe arrives at the communications node; determining, by the communications node, a first time difference TD 1 based on the first time T1 and the second time T2; obtaining, by the communications node, a timing advance TA corresponding to the base station; obtaining, by the communications node, a second time difference TD 2 based on the first time difference TD 1 and the TA, where the second time difference TD 2 is a difference between a time at which the base station sends the subframe and the first time T1; and sending, by the communications node, the second time difference TD 2, the first time T1, and the identifier of the subframe to the base station.

In a possible design, the obtaining, by the communications node, a second time difference TD 2 based on the first time difference TD 1 and the TA includes: obtaining, by the communications node, the second time difference TD 2 based on the following formula: TD 2=TD 1+TA/2, where both the TD 1 and the TD 2 are real numbers, and the TA is a real number greater than 0.

In a possible design, the communications node sends capability information to the base station, where the capability information is used to indicate that the communications node has a global positioning capability; the communications node receives measurement control information from the base station; and the obtaining, by a communications node, a pulse per second PPS includes: obtaining, by the communications node, the pulse per second PPS based on the measurement control information.

In a possible design, the receiving, by the communications node, measurement control information from the base station includes: receiving, by the communications node, a radio resource control RRC message or a minimization of drive tests MDT message from the base station, where the radio resource control RRC message or the minimization of drive tests MDT message carries the measurement control information.

In a possible design, the sending, by the communications node, the second time difference TD 2, the first time T1, and the identifier of the subframe to the base station includes: sending, by the communications node, an RRC measurement report or an MDT measurement report to the base station, where the RRC measurement report or the MDT measurement report includes the second time difference TD 2, the first time T1, and the identifier of the subframe.

According to a second aspect, a communications node is provided, including a processing unit, a sending unit, and a receiving unit. The processing unit is configured to: obtain a pulse per second PPS, and obtain a first time T1 based on the PPS. The receiving unit is configured to receive a subframe and an identifier of the subframe that are sent by a base station. The processing unit is further configured to: obtain a second time T2 based on the subframe, where the second time T2 is a time at which the subframe arrives at the communications node; determine a first time difference TD 1 based on the first time T1 and the second time T2; obtain a timing advance TA corresponding to the base station; and obtain a second time difference TD 2 based on the first time difference TD 1 and the TA, where the second time difference TD 2 is a difference between a time at which the base station sends the subframe and the first time T1. The sending unit is configured to send the second time difference TD 2, the first time T1, and the identifier of the subframe to the base station.

In a possible design, that the processing unit obtains the second time difference TD 2 based on the first time difference TD 1 and the TA includes: the processing unit obtains the second time difference TD 2 based on the following formula: TD 2=TD 1+TA/2, where both the TD 1 and the TD 2 are real numbers, and the TA is a real number greater than 0.

In a possible design, the sending unit is further configured to send capability information to the base station, where the capability information is used to indicate that the communications node has a global positioning capability; the receiving unit is further configured to receive measurement control information from the base station; and that the processing unit obtains the pulse per second PPS includes: the processing unit obtains the pulse per second PPS based on the measurement control information.

In a possible design, that the receiving unit receives the measurement control information from the base station includes: the receiving unit receives a radio resource control RRC message or a minimization of drive tests MDT message from the base station, where the radio resource control RRC message or the minimization of drive tests MDT message carries the measurement control information.

In a possible design, that the sending unit sends the second time difference TD 2, the first time T1, and the identifier of the subframe to the base station includes: the sending unit sends an RRC measurement report or an MDT measurement report to the base station, where the RRC measurement report or the MDT measurement report includes the second time difference TD 2, the first time T1, and the identifier of the subframe.

In a possible design, the processing unit may be a processor, the sending unit may be a transmitter or a transceiver, and the receiving unit may be a receiver or a transceiver.

According to a third aspect, a synchronization information receiving method is provided, including: sending, by a base station, a subframe and an identifier of the subframe to a communications node; receiving, by the base station, a second time difference TD 2, a first time T1, and the identifier of the subframe that are sent by the communications node, where the first time T1 is obtained based on a pulse per second PPS obtained by the communications node, the second time difference TD 2 is obtained based on a first time difference TD 1 and a timing advance TA, the second time difference TD 2 is a difference between a time at which the base station sends the subframe and the first time T1, the first time difference TD 1 is determined based on the first time T1 and a second time T2, the second time T2 is obtained based on the subframe and is a time at which the subframe arrives at the communications node, and the TA is a TA that is obtained by the communications node and that is corresponding to the base station; and adjusting, by the base station, a sending time of a to-be-sent subframe and an identifier of the to-be-sent subframe based on the second time difference TD 2, the first time T1, and the identifier of the subframe.

In a possible design, that the second time difference TD 2 is obtained based on the first time difference TD 1 and the timing advance TA includes: obtaining the second time difference TD 2 based on the following formula: TD 2=TD 1+TA/2, where the TD 1, the TD 2, and the TA are all real numbers greater than 0.

In a possible design, the base station receives capability information from the communications node, where the capability information is used to indicate that the communications node has a global positioning capability; and the base station sends measurement control information to the communications node, where the measurement control information is used to obtain the pulse per second PPS.

In a possible design, the sending, by the base station, measurement control information to the communications node includes: sending, by the base station, a radio resource control RRC message or a minimization of drive tests MDT message to the communications node, where the radio resource control RRC message or the minimization of drive tests MDT message carries the measurement control information.

In a possible design, the receiving, by the base station, a second time difference TD 2, a first time T1, and the identifier of the subframe that are sent by the communications node includes: receiving, by the base station, an RRC measurement report or an MDT measurement report sent by the communications node, where the RRC measurement report or the MDT measurement report includes the second time difference TD 2, the first time T1, and the identifier of the subframe.

In a possible design, the adjusting, by the base station, a sending time of a to-be-sent subframe and an identifier of the to-be-sent subframe based on the second time difference TD 2, the first time T1, and the identifier of the subframe includes: adjusting, by the base station, the sending time of the to-be-sent subframe based on the TD 2; and adjusting, by the base station, the identifier of the to-be-sent subframe based on the first time T1 and the identifier of the subframe.

In a possible design, the communications node includes at least two communications nodes; the sending, by a base station, a subframe and an identifier of the subframe to a communications node includes: sending, by the base station, the subframe and the identifier of the subframe to the at least two communications nodes; the receiving, by the base station, a second time difference TD 2, a first time T1, and the identifier of the subframe that are sent by the communications node includes: receiving, by the base station, a plurality of second time differences TDs 2, a plurality of first times T1, a plurality of frame numbers of radio frames in which subframes are located, and a plurality of subframe numbers of the subframes that are sent by the at least two communications nodes; the method further includes: obtaining, by the base station, an average TD 2 based on an average value of the plurality of second time differences TDs 2 that are received from the at least two communications nodes; and the adjusting, by the base station, a sending time of a to-be-sent subframe and an identifier of the to-be-sent subframe based on the second time difference TD 2, the first time T1, and the identifier of the subframe includes: adjusting, by the base station, the sending time of the to-be-sent subframe and the identifier of the to-be-sent subframe based on the average TD 2, one of the plurality of first times T1, and one of a plurality of subframe identifiers, where the one first time T1 and the one subframe identifier are received by the base station from a same communications node.

According to a fourth aspect, a base station is provided, including a sending unit, a receiving unit, and a processing unit. The sending unit is configured to send a subframe and an identifier of the subframe to a communications node. The receiving unit is configured to receive a second time difference TD 2, a first time T1, and the identifier of the subframe that are sent by the communications node, where the first time T1 is obtained based on a pulse per second PPS obtained by the communications node, the second time difference TD 2 is obtained based on a first time difference TD 1 and a timing advance TA, the second time difference TD 2 is a difference between a time at which the base station sends the subframe and the first time T1, the first time difference TD 1 is determined based on the first time T1 and a second time T2, the second time T2 is obtained based on the subframe and is a time at which the subframe arrives at the communications node, and the TA is a TA that is obtained by the communications node and that is corresponding to the base station. The processing unit is configured to adjust a sending time of a to-be-sent subframe and an identifier of the to-be-sent subframe based on the second time difference TD 2, the first time T1, and the identifier of the subframe.

In a possible design, the subframe is a last subframe received by the communications node before the first time T1; or the subframe is a first subframe received by the communications node after the first time T1.

In a possible design, that the second time difference TD 2 is obtained based on the first time difference TD 1 and the timing advance TA includes: obtaining the second time difference TD 2 based on the following formula: TD 2=TD 1+TA/2, where the TD 1, the TD 2, and the TA are all real numbers greater than 0.

In a possible design, the receiving unit is further configured to receive capability information from the communications node, where the capability information is used to indicate that the communications node has a global positioning capability; and the sending unit is further configured to send measurement control information to the communications node, where the measurement control information is used to obtain the pulse per second PPS.

In a possible design, that the sending unit sends the measurement control information to the communications node includes: the sending unit sends a radio resource control RRC message or a minimization of drive tests MDT message to the communications node, where the radio resource control RRC message or the minimization of drive tests MDT message carries the measurement control information.

In a possible design, that the receiving unit receives the second time difference TD 2, the first time T1, and the identifier of the subframe that are sent by the communications node includes: the receiving unit receives an RRC measurement report or an MDT measurement report sent by the communications node, where the RRC measurement report or the MDT measurement report includes the second time difference TD 2, the first time T1, and the identifier of the subframe.

In a possible design, that the processing unit adjusts the sending time of the to-be-sent subframe and the identifier of the to-be-sent subframe based on the second time difference TD 2, the first time T1, and the identifier of the subframe includes: the processing unit adjusts the sending time of the to-be-sent subframe based on the TD 2; and the processing unit adjusts the identifier of the to-be-sent subframe based on the first time T1 and the identifier of the subframe.

In a possible design, the communications node includes at least two communications nodes; that the sending unit sends the subframe and the identifier of the subframe to the communications node includes: the sending unit sends the subframe and the identifier of the subframe to the at least two communications nodes; that the receiving unit receives the second time difference TD 2, the first time T1, and the identifier of the subframe that are sent by the communications node includes: the receiving unit receives a plurality of second time differences TDs 2, a plurality of first times T1, a plurality of frame numbers of radio frames in which subframes are located, and a plurality of subframe numbers of the subframes that are sent by the at least two communications nodes; the processing unit is further configured to obtain an average TD 2 based on an average value of the plurality of second time differences TDs 2 that are received from the at least two communications nodes; and that the processing unit adjusts the sending time of the to-be-sent subframe and the identifier of the to-be-sent subframe based on the second time difference TD 2, the first time T1, and the identifier of the subframe includes: the processing unit adjusts the sending time of the to-be-sent subframe and the identifier of the to-be-sent subframe based on the average TD 2, one of the plurality of first times T1, and one of a plurality of subframe identifiers, where the one first time T1 and the one subframe identifier are received by the receiving unit from a same communications node.

In a possible design, the processing unit may be a processor, the sending unit may be a transmitter or a transceiver, and the receiving unit may be a receiver or a transceiver. With reference to the first aspect to the fourth aspect, in a possible design, the subframe is the last subframe received by the communications node before the first time T1; or the subframe is the first subframe received by the communications node after the first time T1.

According to a fifth aspect, an embodiment of the present invention provides a computer storage medium, configured to store a computer software instruction used by the base station, and the computer storage medium includes a program designed to execute the foregoing aspects.

According to a sixth aspect, an embodiment of the present invention provides a computer storage medium, configured to store a computer software instruction used by the communications node, and the computer storage medium includes a program designed to execute the foregoing aspects.

According to the foregoing solutions, the base station adjusts the sending time of the subframe, in other words, adjusts a subframe boundary based on the time difference that is between the subframe and the pulse per second PPS and that is obtained from the communications node, and adjusts a radio frame number and a subframe number of the to-be-sent subframe based on the first time T1 and the identifier of the subframe that are obtained from the communications node. Therefore, the base station aligns the radio frame number, the subframe number, and the subframe boundary of the to-be-sent subframe with the pulse per second. Different base stations use a same pulse per second PPS as a reference to adjust a sending time, a radio frame number, and a subframe number of a subframe, so that the different base stations are synchronized with each other.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and a person of ordinary skill in the art can derive other implementations from these accompanying drawings without creative efforts. All of the embodiments or the implementations shall fall within the protection scope of the present invention.

DESCRIPTION OF EMBODIMENTS

A network architecture and a service scenario described in embodiments of the present invention are intended to describe the technical solutions in the embodiments of the present invention more clearly, and do not constitute any limitation on the technical solutions provided in the embodiments of the present invention. A person of ordinary skill in the art may learn that, as the network architecture evolves and a new service scenario emerges, the technical solutions provided in the embodiments of the present invention are also applicable to a similar technical problem.

Figure 1:
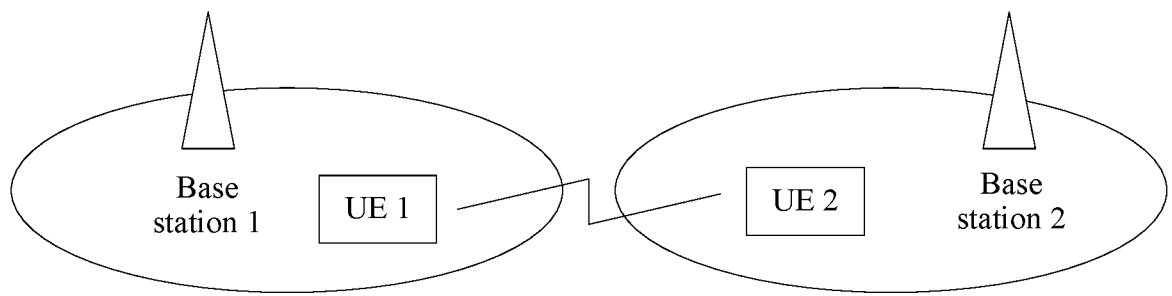
FIG. 1 is a schematic architectural diagram of a system according to an embodiment of the present invention.

As shown in FIG. 1, a communications node 1 (UE 1) is a communications node that accesses a base station 1, and a communications node 2 (UE 2) is a communications node that accesses a base station 2. In D2D communication or V2V communication, the base station 1 allocates a radio resource 1 to the communications node 1, and the base station 2 allocates a radio resource 2 to the communications node 2. The radio resource 1 and the radio resource 2 are usually a same radio resource. Therefore, the communications node 1 and the communications node 2 can directly communicate with each other on the radio resource 1, that is, the radio resource 2 without the help of the base station.

A base station (BS) referred to herein may be an apparatus that is deployed in a radio access network and that is configured to provide a wireless communication function for a communications node. The base station may include macro base stations, micro base stations, relay nodes, access points, and the like in various forms. In systems that use different radio access technologies, a device with a base station function may have different names. For example, in an LTE network, the device is referred to as an evolved NodeB (eNB or eNodeB), and in a 3rd generation 3 G network, the device is referred to as a NodeB, or a road side unit (RSU) in V2V communication. For ease of description, in this application, all the apparatuses that provide a wireless communication function for the communications node are collectively referred to as a base station or a BS.

The communications node referred to herein may include various handheld devices, in-vehicle devices, wearable devices, or computing devices with a wireless communication function; or another processing device connected to a wireless modem; or communications nodes in various forms, including a mobile station (MS), a terminal, a terminal device, user equipment (UE), and the like. For ease of description, in this application, the devices mentioned above are collectively referred to as a communications node.

The embodiments of the present invention are further described below in detail with reference to specific examples.

Figure 2:
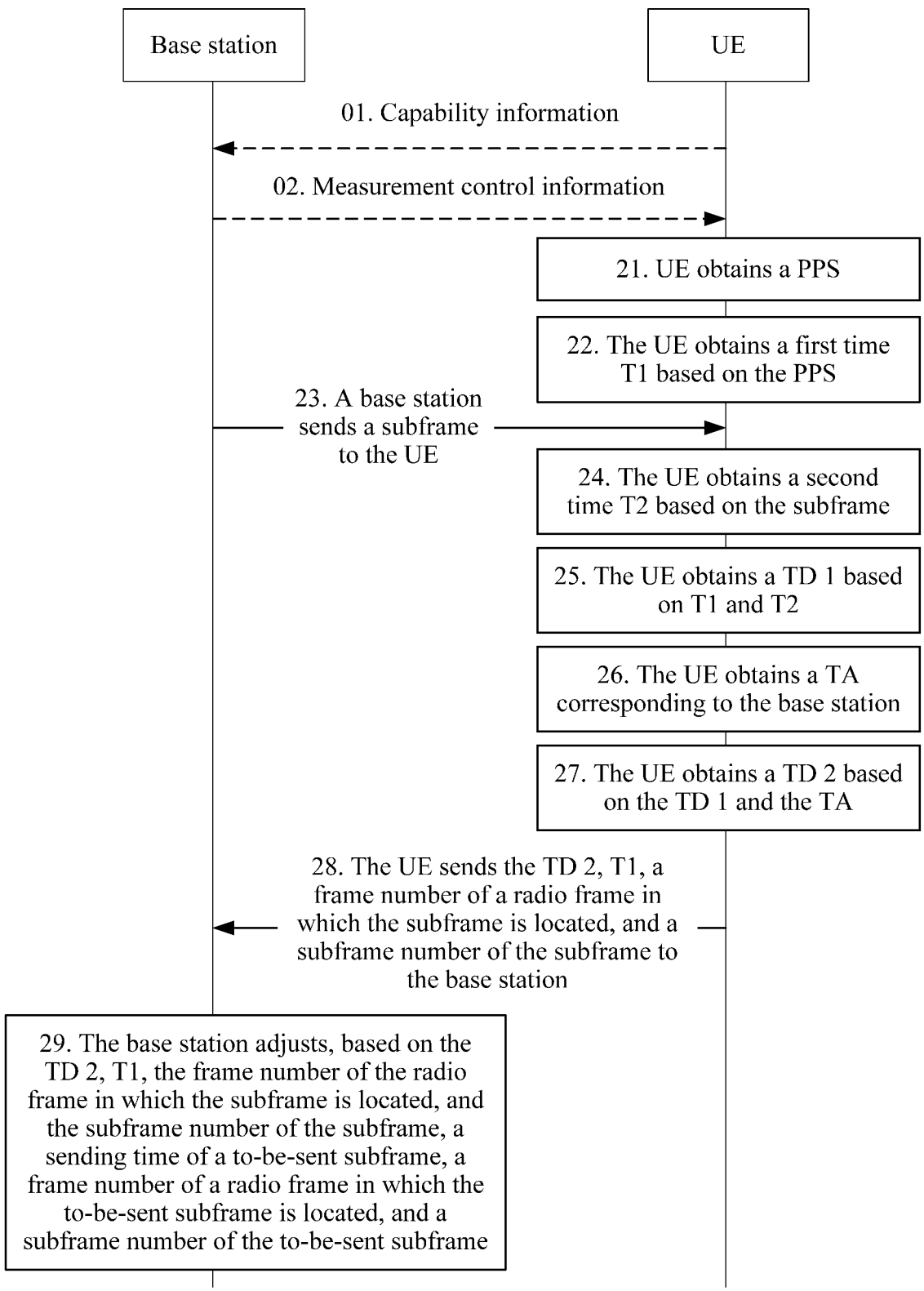
FIG. 2 shows a synchronization method according to an embodiment of the present invention.

FIG. 2 shows a synchronization method according to an embodiment of this application. Specific steps are as follows:

Step 21: A communications node obtains a pulse per second (PPS).

The PPS is a pulse with peaks occurring at intervals of one second. There is an interval of one second between different peaks in terms of time. The PPS may be generated by a crystal oscillator of a communications node having a global navigation satellite system (GNSS).

Step 22: The communications node obtains a first time T1 based on the PPS.

In some embodiments, T1 is a coordinated universal time (UTC). The communications node determines a UTC time as T1 based on a peak of the PPS. Unless otherwise specified, the first time, a second time, and the like mentioned in all the embodiments of the present invention are UTC times.

Step 23: A base station sends a subframe and an identifier of the subframe to the communications node, and the communications node receives the subframe and the identifier of the subframe that are sent by the base station. Optionally, the identifier of the subframe includes a frame number of a radio frame in which the subframe is located and a subframe number of the subframe.

In some embodiments, a sequence of performing step 23 and step 21 is not limited. In other words, step 23 may be performed after step 21, step 23 may be performed before step 21, or step 21 and step 23 are simultaneously performed.

Step 24: The communications node obtains a second time T2 based on the subframe received from the base station in step 23. The second time T2 is a time at which the subframe arrives at the communications node.

In some embodiments, a time length of the subframe is 1 ms. The time at which the subframe arrives at the communications node is a time at which any part of the subframe arrives at the communications node, for example, a time at which a subframe header arrives at the communications node, a time at which a subframe trailer arrives at the communications node, or a time at which an intermediate part of the subframe arrives at the communications node.

The subframe used to obtain the second time T2 may be any subframe received by the communications node from the base station. In some embodiments, the subframe is a last subframe that is received by the communications node before the first time T1 and that is sent by the base station. In other words, the subframe is a subframe received by the communications node from the base station before T1, where there is a shortest time interval between T1 and a time at which the communications node receives the subframe from the base station. Alternatively, the subframe is a first subframe received by the communications node after the first time T1. In other words, the subframe is a subframe received by the communications node from the base station after T1, where there is a shortest time interval between T1 and a time at which the communications node receives the subframe from the base station.

Step 25: The communications node determines a first time difference 1 (TD 1) based on T1 and T2.

In an optional embodiment, the communications node may determine the TD 1 based on the following formula: TD 1=T1−T2. If the subframe is a subframe received by the communications node before T1, the TD 1 is a positive value; or if the subframe is a subframe received by the communications node after T1, the TD 1 is a negative value. In an optional embodiment, the TD 1 may be determined based on the following formula: TD 1=T2−T1.

Step 26: The communications node obtains a timing advance (TA) corresponding to the base station.

The TA is a round-trip delay between the communications node and the base station, that is, a delay of a process in which the base station sends a signal to the communications node and the communications node sends a feedback signal of the signal to the base station. A value of the TA may be measured by the base station, sent by the base station to the communications node, and stored by the communications node in a memory of the communications node.

Step 27: The communications node obtains a second time difference TD 2 based on the first time difference TD 1 and the TA.

In an optional embodiment, in step 27, that the communications node obtains the second time difference TD 2 based on the first time difference TD 1 and the TA includes: the communications node obtains the second time difference TD 2 based on the following formula: TD 2=TD 1+TA/2, where both the TD 1 and the TD 2 are real numbers, and the TA is a real number greater than 0. The first time difference TD 1 is a time difference between the pulse per second PPS and the time at which the communications node receives the subframe, and TA/2 is a delay between the communications node and the base station. Therefore, TD 1+TA/2 is a time difference between a time at which the base station sends the subframe and the pulse per second PPS.

In other words, the second time difference TD 2 is a difference between the time at which the base station sends the subframe and the first time T1. In some embodiments, the time at which the base station sends the subframe is a time at which the base station sends any part of the subframe, for example, a time at which the base station sends the subframe header, a time at which the base station sends the subframe trailer, or a time at which the base station sends the intermediate part of the subframe.

Step 28: The communications node sends the second time difference TD 2, the first time T1, and the identifier of the subframe to the base station, and the base station receives the second time difference TD 2, the first time T1, and the identifier of the subframe that are sent by the communications node.

Step 29: The base station adjusts a sending time of a to-be-sent subframe and an identifier of the to-be-sent subframe based on the second time difference TD 2, the first time T1, and the identifier of the subframe. In some embodiments, the identifier of the to-be-sent subframe includes a frame number of a radio frame in which the to-be-sent subframe is located and a subframe number of the to-be-sent subframe.

According to this embodiment of the present invention, the communications node obtains the first time T1 based on the PPS, obtains the second time T2 based on the subframe received from the base station, obtains the first time difference TD 1 based on the first time T1 and the second time T2, obtains the timing advance TA, and obtains the second time difference TD 2 based on the first time difference TD 1 and the timing advance TA. The base station adjusts the sending time of the to-be-sent subframe and the identifier of the to-be-sent subframe based on the second time difference TD 2, the first time T1, and the identifier of the subframe. Therefore, the communications node sends the difference TD 2 between the time at which the base station sends the subframe and the pulse per second PPS to the base station.

The base station adjusts the sending time of the to-be-sent subframe based on the difference TD 2, and adjusts the identifier of the to-be-sent subframe based on the first time T1 and the identifier of the subframe. In this way, the base station synchronizes the to-be-sent subframe with the PPS. The PPS is a pulse per second, and PPSs obtained by different communications nodes are consistent. Therefore, synchronization between base stations is also implemented.

In an optional embodiment, before step 21, the synchronization method further includes the following steps.

Step 01: The communications node sends capability information to the base station, and the base station receives the capability information from the communications node. The capability information is used to indicate that the communications node has a global positioning capability.

Step 02: The base station sends measurement control information to the communications node, and the communications node receives the measurement control information from the base station. After receiving the measurement control information sent by the base station, the communications node may perform the step of obtaining the PPS and subsequent steps, in other words, perform the steps 21 to 28. By performing step 01 and step 02, the base station may learn of a communications node that has a global positioning capability, and instruct the communications node to perform step 21 and subsequent steps. Therefore, the base station can flexibly control the communications node to perform the synchronization method.

In an optional embodiment, in step 02, the measurement control information sent by the base station to the communications node is carried in a radio resource control (RRC) message or a minimization of drive tests (MDT) message.

In an optional embodiment, before step 21, the synchronization method includes step 03 instead of step 01 and step 02.

Step 03: The base station sends a broadcast message to all communications nodes that access the base station, where the broadcast message includes measurement control information, and the communications node receives the measurement control information from the base station. After receiving the measurement control information sent by the base station, the communications node obtains the PPS based on the measurement control information, in other words, performs the steps 21 to 28.

In an optional embodiment, in step 28, the communications node sends an RRC measurement report or an MDT measurement report to the base station, where the RRC measurement report or the MDT measurement report includes the second time difference TD 2, the first time T1, and the identifier of the subframe.

In an optional embodiment, in step 29, the base station adjusts the sending time of the to-be-sent subframe, in other words, adjusts a subframe boundary of the to-be-sent subframe based on the TD 2, and adjusts the identifier of the to-be-sent subframe based on the first time T1 and the identifier of the subframe. In some embodiments, the base station adjusts the frame number of the radio frame in which the to-be-sent subframe is located and the subframe number of the to-be-sent subframe based on the first time T1, the frame number of the radio frame in which the subframe is located, and the subframe number of the subframe.

In an optional embodiment, the base station adjusts the sending time of the to-be-sent subframe based on the TD 2, where TD 2=TA/2+TD 1, and TD 1=T1−T2. When the subframe is a subframe received by the communications node before T1, both the TD 1 and the TD 2 are positive values. In this case, the base station adjusts the sending time of the to-be-sent subframe backward the TD 2. Alternatively, when the subframe is a subframe received by the communications node after T1, both the TD 1 and the TD 2 are negative values. In this case, the base station adjusts the sending time of the to-be-sent subframe forward the TD 2. In an optional embodiment, TD 1=T2−T1, and TD 2=TA/2+TD 1. When the subframe is a subframe received by the communications node before T1, both the TD 1 and the TD 2 are negative values. In this case, the base station adjusts the sending time of the to-be-sent subframe forward the TD 2. Alternatively, when the subframe is a subframe received by the communications node after T1, both the TD 1 and the TD 2 are positive values. In this case, the base station adjusts the sending time of the to-be-sent subframe backward the TD 2.

In an optional embodiment, a reference time T0 and a reference radio frame number and a reference subframe number that are corresponding to T0 are preset in the base station. Therefore, the base station may calculate, based on T0 and time lengths corresponding to one radio frame and one subframe, a frame number of a radio frame in which a subframe sent by the base station at a specific time is located and a subframe number of the subframe sent by the base station. Therefore, the base station obtains, based on T1 and T0, a radio frame number and a subframe number that should be corresponding to the subframe sent by the base station at the time T1. In some embodiments, one subframe and one radio frame have fixed time lengths. Therefore, the base station may calculate, based on a time length between T1 and T0, a quantity of radio frames and a quantity of subframes that should exist between T1 and T0, and calculate, based on the reference radio frame number and the reference subframe number that are corresponding to the time T0, the radio frame number and the subframe number that should be corresponding to the subframe sent by the base station at the time T1.

In an optional embodiment, the identifier of the subframe in step 23 includes the frame number of the radio frame in which the subframe is located and the subframe number of the subframe. The base station obtains a radio frame number offset (N_frame_offset) based on the frame number of the radio frame in which the subframe received by the communications node in step 23 is located and the radio frame number that should be corresponding to the time T1. The base station obtains a subframe number offset (N_subframe_offset) based on the subframe number of the subframe received by the communications node in step 23 and the subframe number that should be corresponding to the time T1. Then the base station adjusts, based on the radio frame number offset, the frame number (N_current_frame) of the radio frame in which the to-be-sent subframe is located, and adjusts the subframe number (N_current_subframe) of the to-be-sent subframe based on the subframe number offset. For example, the base station adjusts the frame number of the radio frame in which the to-be-sent subframe is located and the subframe number of the to-be-sent subframe based on formulas N_current_frame'=N_current_frame+N_frame_offset and N_current_subframe'=N_current_subframe+N_subframe_offset. N_current_frame' is an adjusted to-be-sent frame number, and N_current_subframe' is an adjusted subframe number.

In an optional embodiment, a sequence of adjusting the sending time of the to-be-sent subframe by the base station based on the TD 2 and adjusting the identifier of the to-be-sent subframe by the base station based on the first time T1 and the identifier of the subframe is not limited.

For example, the base station obtains the frame number offset of the radio frame in which the to-be-sent subframe is located and the subframe number offset of the to-be-sent subframe based on T1, the frame number of the radio frame in which the subframe is located, and the subframe number of the subframe. Then the base station adjusts, based on the frame number offset of the radio frame, the frame number of the radio frame in which the to-be-sent subframe is located, and adjusts the subframe number of the to-be-sent subframe based on the subframe number offset. Then the base station adjusts, backward the TD 2, the sending time of the to-be-sent subframe for which the radio frame number and the subframe number are adjusted.

In an optional embodiment, the base station may receive TDs 2 from a plurality of communications nodes that access the base station, and average the plurality of received TDs 2, to improve base station synchronization precision. The communications node includes at least two communications nodes. The base station obtains an average TD 2 based on an average value of a plurality of second time differences TDs 2 that are received from the at least two communications nodes. The base station adjusts the sending time of the to-be-sent subframe and the identifier of the to-be-sent subframe (for example, the frame number of the radio frame in which the to-be-sent subframe is located and the subframe number of the to-be-sent subframe) based on the average TD 2, one of a plurality of first times T1, and one of a plurality of subframe identifiers (for example, one of a plurality of frame numbers of radio frames in which subframes are located and one of a plurality of subframe numbers of the subframes). The one first time T1 and the one subframe identifier are received by the base station from a same communications node.

For example, two communications nodes, namely, a communications node 1 and a communications node 2, access the base station. The communications node 1 obtains, according to the steps 21 to 28, a second time difference TD 21, a first time T11, a frame number of a radio frame in which a subframe received by the communications node 1 is located, and a subframe number of the subframe received by the communications node 1. The communications node 2 obtains, according to the steps 21 to 28, a second time difference TD 22, a first time T12, a frame number of a radio frame in which a subframe received by the communications node 2 is located, and a subframe number of the subframe received by the communications node 2. The communications node 1 sends, to the base station, the TD 21, T11, the frame number of the radio frame in which the subframe received by the communications node 1 is located, and the subframe number of the subframe received by the communications node 1, and the communications node 2 sends, to the base station, the TD 22, T12, the frame number of the radio frame in which the subframe received by the communications node 2 is located, and the subframe number of the subframe received by the communications node 2. The base station performs arithmetic averaging on the received TD 21 and TD 22, to obtain an average TD 2.

The base station adjusts the sending time of the to-be-sent subframe and the identifier of the to-be-sent subframe based on the average TD 2, the first time T11, the frame number of the radio frame in which the subframe received by the communications node 1 is located, and the subframe number of the subframe received by the communications node 1. Alternatively, the base station adjusts the sending time of the to-be-sent subframe and the identifier of the to-be-sent subframe based on the average TD 2, the first time T12, the frame number of the radio frame in which the subframe received by the communications node 2 is located, and the subframe number of the subframe received by the communications node 2. In some embodiments, the base station adjusts the sending time of the subframe to be sent by the base station and the identifier of the to-be-sent subframe based on the average TD 2, a first time T1 of a communications node whose TD 2 is closer to the average TD 2 in a plurality of communications nodes, and an identifier of a subframe received by the communications node. In this optional embodiment, the base station adjusts the sending time of the to-be-sent subframe based on an average value of second time differences sent by a plurality of communications nodes that access the base station, so that base station synchronization precision is improved.

The solutions provided in the embodiments of the present invention are mainly described above from a perspective of interaction between network elements. It may be understood that, to implement the foregoing functions, each network element such as the communications node, the base station, or a core network entity includes a corresponding hardware structure and/or software module for performing each function. A person skilled in the art should be easily aware that, with reference to units and algorithm steps in the examples described in the embodiments disclosed in this specification, the present invention can be implemented in a form of hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the present invention.

Figure 3:
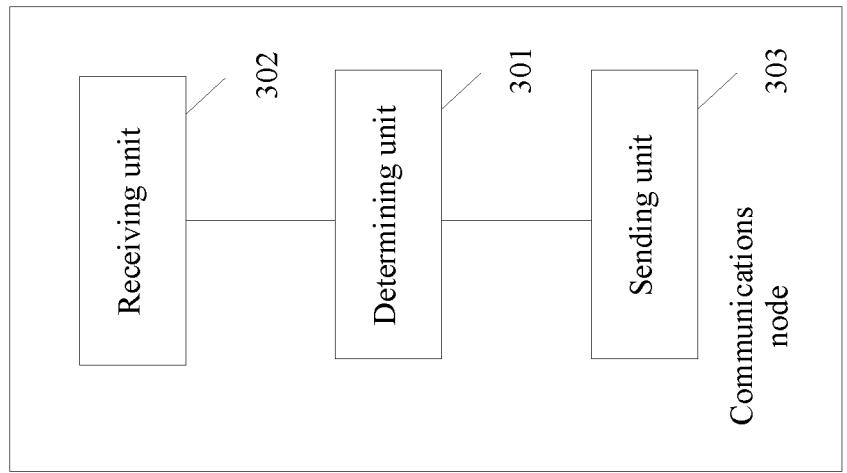
FIG. 3 shows a communications node according to an embodiment of the present invention.

FIG. 3 is a possible schematic structural diagram of a communications node configured to perform the method in the embodiment in FIG. 2. The communications node includes a processing unit 301, a receiving unit 302, and a sending unit 303.

The processing unit 301 is configured to obtain a pulse per second PPS. The PPS is consistent with the PPS in the embodiment in FIG. 2.

The processing unit 301 is further configured to obtain a first time T1 based on the PPS. In some embodiments, T1 is a UTC time. The processing unit 301 determines a UTC time based on a peak of the PPS.

The receiving unit 302 is configured to receive a subframe and an identifier of the subframe that are sent by a base station. In an optional embodiment, the identifier of the subframe includes a frame number of a radio frame in which the subframe is located and a subframe number of the subframe.

The processing unit 301 is further configured to obtain a second time T2 based on the subframe received by the receiving unit 302, where the second time T2 is a time at which the subframe arrives at the communications node.

In some embodiments, a time length of the subframe is 1 ms. The time at which the subframe arrives at the communications node is a time at which any part of the subframe arrives at the communications node, for example, a time at which a subframe header arrives at the communications node, a time at which a subframe trailer arrives at the communications node, or a time at which an intermediate part of the subframe arrives at the communications node.

The subframe used to obtain the second time T2 may be any subframe received by the receiving unit 302 from the base station. In some embodiments, the subframe is a last subframe that is received by the communications node before the first time T1 and that is sent by the base station. In other words, the subframe is a subframe received by the communications node from the base station before T1, where there is a shortest time interval between T1 and a time at which the communications node receives the subframe from the base station. Alternatively, the subframe is a first subframe received by the communications node after the first time T1. In other words, the subframe is a subframe received by the communications node from the base station after T1, where there is a shortest time interval between T1 and a time at which the communications node receives the subframe from the base station.

The processing unit 301 is further configured to determine a first time difference TD 1 based on the first time T1 and the second time T2. In an optional embodiment, the TD 1 may be determined based on the following formula: TD 1=T1−T2. If the subframe is a subframe received by the receiving unit 302 before T1, the TD 1 is a positive value; or if the subframe is a subframe received by the receiving unit 302 after T1, the TD 1 is a negative value. In an optional embodiment, the TD 1 may be determined based on the following formula: TD 1=T2−T1. If the subframe is a subframe received by the receiving unit 302 before T1, the TD 1 is a negative value; or if the subframe is a subframe received by the receiving unit 302 after T1, the TD 1 is a positive value.

The processing unit 301 is further configured to obtain a timing advance TA corresponding to the base station. The TA is consistent with the TA in the embodiment in FIG. 2.

The processing unit 301 is further configured to obtain a second time difference TD 2 based on the first time difference TD 1 and the TA, where the second time difference TD 2 is a difference between a time at which the base station sends the subframe and the first time T1. In an optional embodiment, that the processing unit 301 obtains the second time difference TD 2 based on the first time difference TD 1 and the TA includes: the processing unit 301 obtains the second time difference TD 2 based on the following formula: TD 2=TD 1+TA/2, where both the TD 1 and the TD 2 are real numbers, and the TA is a real number greater than 0. The first time difference TD 1 is a time difference between the pulse per second PPS and the time at which the communications node receives the subframe, and TA/2 is a delay between the communications node and the base station. Therefore, TD 1+TA/2 is a time difference between the time at which the base station sends the subframe and the pulse per second PPS. In some embodiments, the time at which the base station sends the subframe is a time at which the base station sends any part of the subframe, for example, a time at which the base station sends the subframe header, a time at which the base station sends the subframe trailer, or a time at which the base station sends the intermediate part of the subframe.

The sending unit 303 is configured to send the second time difference TD 2, the first time T1, and the identifier of the subframe to the base station.

According to this embodiment of the present invention, the communications node obtains the first time T1 based on the PPS, obtains the second time T2 based on the subframe received from the base station, obtains the first time difference TD 1 based on the first time T1 and the second time T2, obtains the timing advance TA, and obtains the second time difference TD 2 based on the first time difference TD 1 and the timing advance TA. The communications node sends the difference TD 2 between the time at which the base station sends the subframe and the pulse per second PPS to the base station. The base station adjusts a sending time of a to-be-sent subframe based on the difference TD 2, and adjusts an identifier of the to-be-sent subframe based on the first time T1 and the identifier of the subframe. In this way, the base station synchronizes the to-be-sent subframe with the PPS. The PPS is a pulse per second, and PPSs obtained by different communications nodes are consistent. Therefore, synchronization between base stations is also implemented.

In an optional embodiment, before the processing unit 301 obtains the PPS, the sending unit 303 is further configured to send capability information to the base station. The capability information is used to indicate that the communications node has a global positioning capability. The receiving unit 302 is further configured to receive measurement control information from the base station. After receiving the measurement control information sent by the base station, the communications node may perform the step of obtaining the PPS and subsequent steps, in other words, perform the steps 21 to 28 in the embodiment in FIG. 2. The sending unit 303 sends the capability information to the base station, and the receiving unit 302 receives the measurement control information from the base station. In this case, the base station may learn of a communications node that has a global positioning capability, and instruct the communications node to perform step 21 and subsequent steps. Therefore, the base station can flexibly control the communications node to perform the synchronization method. The capability information and the measurement control information are consistent with the capability information and the measurement control information in the embodiment in FIG. 2.

In an optional embodiment, before the processing unit 301 obtains the PPS, the receiving unit 302 is further configured to receive a broadcast message sent by the base station to all communications nodes that access the base station, where the broadcast message includes measurement control information. After receiving the measurement control information sent by the base station, the communications node obtains the PPS based on the measurement control information, in other words, performs the steps 21 to 28 in the embodiment in FIG. 2.

In an optional embodiment, the sending unit 303 sends an RRC measurement report or an MDT measurement report to the base station, where the RRC measurement report or the MDT measurement report includes the second time difference TD 2, the first time T1, and the identifier of the subframe.

Figure 4:
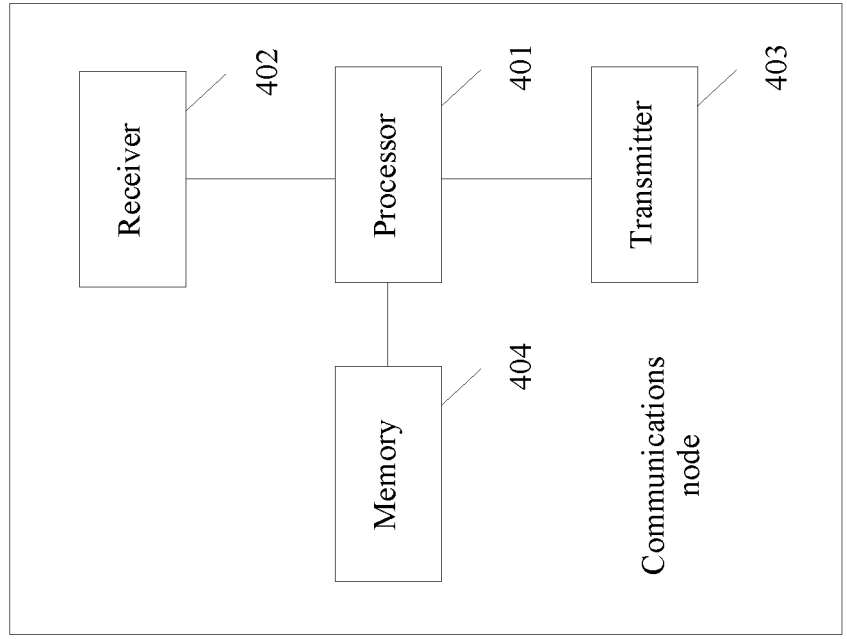
FIG. 4 shows another communications node according to an embodiment of the present invention.

In an optional embodiment, the processing unit 301 may be a processor 401, the receiving unit 302 may be a receiver 402, and the sending unit 303 may be a transmitter 403. The receiver 402 or the transmitter 403 may be replaced with a transceiver. In addition, the communications node may further include a memory 404. The memory 404 is configured to store program code and data of the communications node. Specifically, as shown in FIG. 4, the communications node includes the processor 401, the receiver 402, the transmitter 403, and the memory 404.

Figure 5:
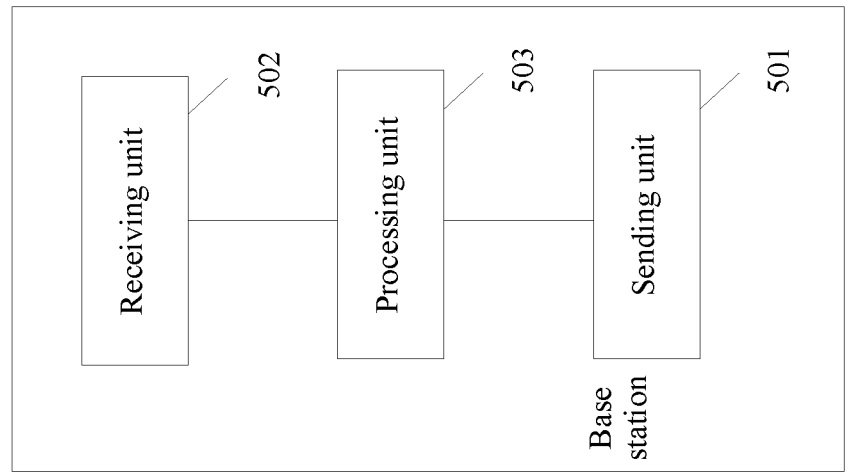
FIG. 5 shows a base station according to an embodiment of the present invention.
Figure 6:
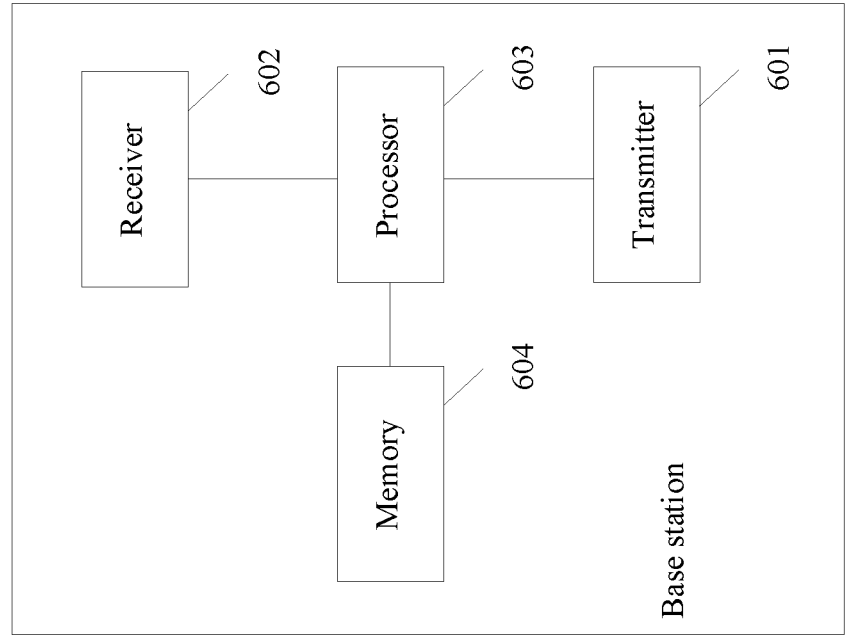
FIG. 6 shows another base station according to an embodiment of the present invention.

FIG. 5 is a possible schematic structural diagram of a base station configured to perform the method in the embodiment in FIG. 2. The base station includes a sending unit 501, a receiving unit 502, and a processing unit 503.

The sending unit 501 is configured to send a subframe and an identifier of the subframe to a communications node. The subframe is consistent with the subframe in the embodiment in FIG. 2. In an optional embodiment, the identifier of the subframe includes a frame number of a radio frame in which the subframe is located and a subframe number of the subframe.

The receiving unit 502 is configured to receive a second time difference TD 2, a first time T1, and the identifier of the subframe that are sent by the communications node. The first time T1 is obtained based on a pulse per second PPS obtained by the communications node, the second time difference TD 2 is obtained based on a first time difference TD 1 and a timing advance TA, the second time difference TD 2 is a difference between a time at which the base station sends the subframe and the first time T1, the first time difference TD 1 is determined based on the first time T1 and a second time T2, the second time T2 is obtained based on the subframe and is a time at which the subframe arrives at the communications node, and the TA is a TA that is obtained by the communications node and that is corresponding to the base station.

The processing unit 503 is configured to adjust a sending time of a to-be-sent subframe and an identifier of the to-be-sent subframe based on the second time difference TD 2, the first time T1, and the identifier of the subframe.

In an optional embodiment, the receiving unit 502 is further configured to receive capability information from the communications node. The sending unit 501 is further configured to send measurement control information to the communications node. The capability information and the measurement control information are consistent with the capability information and the measurement control information in the embodiment in FIG. 2.

In an optional embodiment, the sending unit 501 is further configured to send a broadcast message to all communications nodes that access the base station. The broadcast message includes measurement control information.

In an optional embodiment, the receiving unit 502 receives an RRC measurement report or an MDT measurement report from the communications node, where the RRC measurement report or the MDT measurement report includes the second time difference TD 2, the first time T1, and the identifier of the subframe.

In an optional embodiment, the processing unit 503 adjusts the sending time of the to-be-sent subframe, in other words, adjusts a subframe boundary of the to-be-sent subframe based on the TD 2, and the processing unit 503 adjusts the identifier of the to-be-sent subframe based on the first time T1 and the identifier of the subframe.

In an optional embodiment, the processing unit 503 adjusts the sending time of the to-be-sent subframe based on the TD 2, where TD 2=TA/2+TD 1, and TD 1=T1−T2. When the subframe is a subframe received by the communications node before T1, both the TD 1 and the TD 2 are positive values. In this case, the processing unit 503 adjusts the sending time of the to-be-sent subframe backward the TD 2. Alternatively, when the subframe is a subframe received by the communications node after T1, both the TD 1 and the TD 2 are negative values. In this case, the processing unit 503 adjusts the sending time of the to-be-sent subframe forward the TD 2. In an optional embodiment, TD 1=T2−T1, and TD 2=TA/2+TD 1. When the subframe is a subframe received by the communications node before T1, both the TD 1 and the TD 2 are negative values. In this case, the processing unit 503 adjusts the sending time of the to-be-sent subframe forward the TD 2. Alternatively, when the subframe is a subframe received by the communications node after T1, both the TD 1 and the TD 2 are positive values. In this case, the processing unit 503 adjusts the sending time of the to-be-sent subframe backward the TD 2.

In an optional embodiment, a reference time T0 and a reference radio frame number and a reference subframe number that are corresponding to T0 are preset in the processing unit 503. Therefore, the processing unit 503 may calculate, based on T0 and time lengths corresponding to one radio frame and one subframe, a frame number of a radio frame in which a subframe sent by the base station at a specific time is located and a subframe number of the subframe sent by the base station. Therefore, the processing unit 503 obtains, based on T1 and T0, a radio frame number and a subframe number that should be corresponding to the subframe sent by the base station at the time T1. In some embodiments, one subframe and one radio frame have fixed time lengths. Therefore, the processing unit 503 may calculate, based on a time length between T1 and T0, a quantity of radio frames and a quantity of subframes that should exist between T1 and T0, and calculate, based on the reference radio frame number and the reference subframe number that are corresponding to the time T0, the radio frame number and the subframe number that should be corresponding to the subframe sent by the base station at the time T1.

In an optional embodiment, the processing unit 503 obtains a radio frame number offset (N_frame_offset) based on the frame number of the radio frame in which the subframe received by the communications node is located and the radio frame number that should be corresponding to the time T1. The processing unit 503 obtains a subframe number offset (N_subframe_offset) based on the subframe number of the subframe received by the communications node in step 23 and the subframe number that should be corresponding to the time T1. Then the processing unit 503 adjusts, based on the radio frame number offset, the frame number (N_current_frame) of the radio frame in which the to-be-sent subframe is located, and adjusts the subframe number (N_current_subframe) of the to-be-sent subframe based on the subframe number offset. For example, the processing unit 503 adjusts the frame number of the radio frame in which the to-be-sent subframe is located and the subframe number of the to-be-sent subframe based on formulas N_current_frame'=N_current_frame+N_frame_offset and N_current_subframe'=N_current_subframe+N_subframe_offset. N_current_frame' is an adjusted to-be-sent frame number, and N_current_subframe' is an adjusted subframe number.

In an optional embodiment, a sequence of adjusting the sending time of the to-be-sent subframe by the processing unit 503 based on the TD 2 and adjusting the identifier of the to-be-sent subframe by the processing unit 503 based on the first time T1 and the identifier of the subframe is not limited. For example, the processing unit 503 obtains the frame number offset of the radio frame in which the to-be-sent subframe is located and the subframe number offset of the to-be-sent subframe based on T1 and the identifier of the subframe. Then the processing unit 503 adjusts, based on the frame number offset of the radio frame, the frame number of the radio frame in which the to-be-sent subframe is located, and adjusts the subframe number of the to-be-sent subframe based on the subframe number offset. Then the processing unit 503 adjusts, backward the TD 2, the sending time of the to-be-sent subframe for which the radio frame number and the subframe number are adjusted.

In an optional embodiment, the base station may receive TDs 2 from a plurality of communications nodes that access the base station, and average the plurality of received TDs 2, to improve base station synchronization precision. For details, refer to the description in the embodiment in FIG. 2.

In an optional embodiment, the sending unit 501 may be a transmitter 601, the receiving unit 502 may be a receiver 602, and the processing unit 503 may be a processor 603. The receiver 602 or the transmitter 601 may be replaced with a transceiver. In addition, the base station may further include a memory 604. The memory 604 is configured to store program code and data of the communications node. Specifically, as shown in FIG. 5, the communications node includes the transmitter 601, the receiver 602, the processor 603, and the memory 604.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Moreover, if no conflict occurs, the embodiments in the present invention and the features in the embodiments may be mutually combined.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A synchronization information sending method, comprising:
    obtaining, by a communications node, a pulse per second (PPS);
    obtaining, by the communications node, a first time T1 based on the PPS;
    receiving, by the communications node, a subframe and an identifier of the subframe that are sent by a base station;
    obtaining, by the communications node, a second time T2 based on the subframe, wherein the second time T2 is a time at which the subframe arrives at the communications node;
    determining, by the communications node, a first time difference (TD) 1 based on a difference between the first time T1 and the second time T2;
    obtaining, by the communications node, a timing advance (TA) corresponding to the base station;
    obtaining, by the communications node, a second time difference (TD) 2 based on the first time difference (TD) 1 and the TA, wherein the second time difference (TD) 2 is a difference between a time at which the base station sends the subframe and the first time T1; and
    sending, by the communications node, the second time difference (TD) 2, the first time T1, and the identifier of the subframe to the base station.

2. The method according to claim 1, wherein
    the subframe is a last subframe received by the communications node before the first time T1; or
    the subframe is a first subframe received by the communications node after the first time T1.

3. The method according to claim 1, wherein
    obtaining, by the communications node, the second time difference (TD) 2 based on the first time difference (TD) 1 and the TA comprises:
    obtaining, by the communications node, the second time difference (TD) 2 based on the following formula: TD 2=TD 1+TA/2, wherein both the TD 1 and the TD 2 are real numbers, and the TA is a real number greater than 0.

4. The method according to claim 1, before the obtaining, by a communications node, a pulse per second (PPS), further comprising:
    sending, by the communications node, capability information to the base station, wherein the capability information indicates that the communications node has a global positioning capability; and
    receiving, by the communications node, measurement control information from the base station.

5. The method according to claim 4, wherein
    receiving, by the communications node, the measurement control information from the base station comprises:
    receiving, by the communications node, a radio resource control RRC message or a minimization of drive tests (MDT) message from the base station, wherein the radio resource control RRC message or the minimization of drive tests (MDT) message carries the measurement control information.

6. A communications node, comprising:
    a receiving unit, configured to receive a subframe and an identifier of the subframe that are sent by a base station;
    a processing unit, configured to:
        obtain a pulse per second (PPS); obtain a first time T1 based on the PPS;
        obtain a second time T2 based on the subframe received by the receiving unit, wherein the second time T2 is a time at which the subframe arrives at the communications node; determine a first time difference (TD) 1 based on a difference between the first time T1 and the second time T2;
        obtain a timing advance (TA) corresponding to the base station; and
        obtain a second time difference (TD) 2 based on the first time difference (TD) 1 and the TA, wherein the second time difference (TD) 2 is a difference between a time at which the base station sends the subframe and the first time T1; and
    a sending unit, configured to send the second time difference (TD) 2, the first time T1, and the identifier of the subframe to the base station.

7. The communications node according to claim 6, wherein
    the subframe is a last subframe received by the communications node before the first time T1; or
    the subframe is a first subframe received by the communications node after the first time T1.

8. The communications node according to claim 6, wherein
    obtaining, by the processing unit, the second time difference (TD) 2 based on the first time difference (TD) 1 and the TA comprises:
    obtaining, by the processing unit, the second time difference (TD) 2 based on the following formula: TD 2=TD 1+TA/2, wherein both the TD 1 and the TD 2 are real numbers, and the TA is a real number greater than 0.

9. The communications node according to claim 8, wherein
    receiving, by the receiving unit, measurement control information from the base station comprises:
    receiving, by the receiving unit, a radio resource control (RRC) message or a minimization of drive tests (MDT) message from the base station, wherein the radio resource control (RRC) message or the minimization of drive tests (MDT) message carries the measurement control information.

10. The communications node according to claim 9, wherein
    sending, by the sending unit, the second time difference (TD) 2, the first time T1, and the identifier of the subframe to the base station comprises:
    sending, by the sending unit, an RRC measurement report or an MDT measurement report to the base station, wherein the RRC measurement report or the MDT measurement report comprises the second time difference (TD) 2, the first time T1, and the identifier of the subframe.

11. A synchronization information receiving method, comprising:
sending, by a base station, a subframe and an identifier of the subframe to a communications node;
receiving, by the base station, a second time difference (TD) 2, a first time T1, and the identifier of the subframe that are sent by the communications node, wherein
the first time T1 is obtained based on a pulse per second PPS obtained by the communications node, and
the second time difference (TD) 2 is obtained based on a first time difference (TD) 1 and a timing advance (TA), wherein
the second time difference (TD) 2 is a difference between a time at which the base station sends the subframe and the first time T1,
the first time difference (TD) 1 is determined based on a difference between the first time T1 and a second time T2,
the second time T2 is obtained based on the subframe and being a time at which the subframe arrives at the communications node, and
the TA is a TA corresponding to the communications node and the base station; and
adjusting, by the base station, a sending time of a to-be-sent subframe and an identifier of the to-be-sent subframe based on the second time difference (TD) 2, the first time T1, and the identifier of the subframe.

12. The method according to claim 11, wherein
the subframe sent by the base station is a last subframe received by the communications node before the first time T1; or
the subframe sent by the base station is a first subframe received by the communications node after the first time T1.

13. The method according to claim 12, wherein
sending, by the base station, the measurement control information to the communications node comprises:
sending, by the base station, a radio resource control RRC message or a minimization of drive tests (MDT) message to the communications node, wherein the radio resource control (RRC) message or the minimization of drive tests (MDT) message carries the measurement control information.

14. The method according to claim 13, wherein
receiving, by the base station, the second time difference (TD) 2, a first time T1, and the identifier of the subframe that are sent by the communications node comprises:
receiving, by the base station, an RRC measurement report or an MDT measurement report sent by the communications node, wherein the RRC measurement report or the MDT measurement report comprises the second time difference (TD) 2, the first time T1, and the identifier of the subframe.

15. The method according to claim 11, wherein
the communications node comprises at least two communications nodes;
sending, by the base station, the subframe and an identifier of the subframe to the communications node comprises: sending, by the base station, the subframe and the identifier of the subframe to the at least two communications nodes;
receiving, by the base station, the second time difference (TD) 2, the first time T1, and the identifier of the subframe that are sent by the communications node comprises: receiving, by the base station, a plurality of second time differences (TDs) 2, a plurality of first times T1, and a plurality of subframe identifiers that are sent by the at least two communications nodes;
the method further comprises:
obtaining, by the base station, an average TD 2 based on an average value of the plurality of second time differences (TDs) 2 that are received from the at least two communications nodes; and, wherein
adjusting, by the base station, the sending time of a to-be-sent subframe and the identifier of the to-be-sent subframe based on the second time difference (TD) 2, the first time T1, and the identifier of the subframe comprises:
adjusting, by the base station, the sending time of the to-be-sent subframe and the identifier of the to-be-sent subframe based on the average TD 2, one of the plurality of first times T1, and one of the plurality of subframe identifiers, wherein the one first time T1 and the one subframe identifier are received by the base station from a same communications node.

\* \* \* \* \*